United States Patent [19]
Burckhardt et al.

[11] Patent Number: 4,861,118
[45] Date of Patent: Aug. 29, 1989

[54] ANTI-LOCK BRAKE SYSTEM

[75] Inventors: Manfred Burckhardt, Waiblingen; Franz Brugger, Weinstadt; Andreas Faulhaber, Winnenden, all of Fed. Rep. of Germany

[73] Assignee: Dailmer-Benz Aktiengesellschaft, Stuttgart, Fed. Rep. of Germany

[21] Appl. No.: 301,959

[22] Filed: Jan. 26, 1989

[30] Foreign Application Priority Data

Jan. 26, 1988 [DE] Fed. Rep. of Germany ....... 3802132
Nov. 19, 1988 [DE] Fed. Rep. of Germany ....... 3839178

[51] Int. Cl.$^4$ .................. B60K 28/16; B60T 8/32; B60T 13/12
[52] U.S. Cl. .................. 303/110; 180/197; 180/233; 180/244; 188/181 R; 303/92; 303/100; 303/116; 303/119; 303/10; 303/68
[58] Field of Search ............ 303/100, 110, 116, 119, 303/10-12, 92, 93, 113, 114, 117, 68-69, DIG. 5, 3-4; 188/181, 345; 180/197, 233, 244

[56] References Cited

U.S. PATENT DOCUMENTS

| 3,948,568 | 4/1976 | Leiber | 303/119 X |
| 4,354,715 | 10/1982 | Farr et al. | 303/116 |
| 4,480,877 | 11/1984 | Resch | 303/116 |
| 4,509,802 | 4/1985 | Solleder et al. | 303/110 X |
| 4,569,560 | 2/1986 | Kubo | 303/92 X |
| 4,726,630 | 2/1988 | Krohn et al. | 180/197 X |
| 4,730,879 | 3/1988 | Adachi et al. | 303/116 |
| 4,778,226 | 10/1988 | Brown | 303/110 X |
| 4,779,936 | 10/1988 | Farr | 303/116 |
| 4,790,607 | 12/1988 | Atkins | 303/100 X |
| 4,793,662 | 12/1988 | Arikawa | 303/100 X |
| 4,805,965 | 2/1989 | Jonner et al. | 303/100 |

FOREIGN PATENT DOCUMENTS

3137287 1/1984 Fed. Rep. of Germany .

Primary Examiner—Douglas C. Butler
Attorney, Agent, or Firm—Barnes & Thornburg

[57] ABSTRACT

An anti-lock brake system (ABS) for a road vehicle is equipped with a wheel slip control system (ASR) and a hydraulic dual circuit brake system having front axle/rear axle brake static brake circuits, one brake circuit being allocated to the driven (rear) wheels of the vehicle and one to the non-driven (front) wheels. The system has two high-pressure pumps, one for each of the two brake circuits and which, in control phases of the ABS, brake fluid can be fed into the output pressure spaces of the brake unit and wherein the high-pressure pump allocated to the rear axle brake circuit is also utilized as auxiliary pressure source for the ASR. At the front axle brake circuit, the ABS operates on the feedback principle and at the rear axle brake circuit it operates on the discharge principle.

12 Claims, 1 Drawing Sheet

ANTI-LOCK BRAKE SYSTEM

BACKGROUND AND SUMMARY OF THE INVENTION

The invention relates to an anti-lock brake system (ABS) for a road vehicle which is also equipped with a wheel slip control system (ASR) which operates on the principle of decelerating a vehicle wheel tending to spin, by activating its wheel brake, so that wheel slip remains held within a defined range of values compatible with adequate directional stability. The brake system has a hydraulic dual-circuit brake system having two static brake circuits, one brake circuit being allocated to the undriven wheels of the vehicle and the other brake circuit being allocated to the driven wheels of the vehicle. A brake unit is provided for supplying brake pressure to the two brake circuits and has a primary and a secondary output-pressure space, one of which is allocated to each of the brake circuits respectively, and from which brake pressures can be applied to the brake circuits after being built up by pedal-force-controlled displacement of a piston means movably delimiting the output pressure spaces. A high-pressure pump is provided for each of the two brake circuits to feed brake fluid into the output pressure spaces of the brake unit in control phases of the ABS system for the purpose of preventing the brake circuits from becoming empty as well as to obtain a warning as to the activation of the ABS system. The high-pressure pump for the brake circuit of the driven vehicle wheels also provides an auxiliary pressure source for the ASR system to supply brake pressure to the wheel brake(s) of the driven wheels subjected to wheel slip under control of brake pressure control valves individually allocated to the wheel brakes control. The brake circuit of the driven vehicle wheels is connected and disconnected to the secondary output-pressure space, which is separated with respect to the primary output-pressure space of the brake unit by a floating piston, under control of output signals from an electronic control unit by an ASR Control valve for the duration of control cycles of the ASR system. The ASR control valve assumes a throughflow position during normal braking mode and braking mode subjected to an anti-lock control wherein the brake circuit of the driven vehicle wheels is connected to the secondary output-pressure space of the brake unit.

An ABS control combined with an ASR control is known from German Patent DE No. 31 37 287.

The known ABS operates on the so-called feedback principle, wherein during pressure reduction control phases of the anti-lock control, the brake fluid discharged from the wheel brake(s), subjected to ABS control, is pumped back into the output pressure space of a brake unit designed as a tandem master cylinder by return pumps individually allocated to the respective brake circuits. Here it is presupposed that the brake circuits are closed brake circuits. In pressure build-up phases of the wheel slip control, the pressure loading of the wheel brake(s), subjected to known ABS and ASR, is effected by feeding in pressure from a pressure accumulator provided as an auxiliary pressure source of the ASR under control of a function control valve. In order to achieve as simple an overall structure as possible of the two combined control systems, i.e., to save on hydraulic functional components to the greatest extent possible, the ABS return pump allocated to the brake circuit of the driven vehicle wheels (normally the rear axle brake circuit) is utilized as accumulator charging pump for the pressure accumulator provided as pressure source for the wheel slip control. For this purpose, a 3/2-way solenoid valve is used both as ASR control valve and as accumulator charging valve and in its neutral position allows brake pressure to be fed out of the brake unit into the wheel brakes of the brake circuit of the driven vehicle wheels. In this neutral position, the pressure accumulator is shut off from the main brake line branching towards the wheel brakes. In the excited position of this valve, the brake unit is shut off from the main brake line of the brake circuit of the driven vehicle wheels while the pressure accumulator is then connected to this main brake line. In this excited position of the function control valve, the pressure accumulator can also be charged by a return pump of the ABS. The brake circuit of the driven vehicle wheels is also closed in ASR mode, in the sense that brake fluid discharged in pressure reduction phases of the wheel slip control from the wheel brake(s) subjected to ASR control is pumped back into the pressure accumulator. However, to ensure that this pressure accumulator cannot be exhausted by a large number of successive control cycles of the wheel slip control, since each pressure build-up and pressure reduction cycle of the wheel slip control is associated with a reduction in the contents of the accumulator which, though small, is not negligible (the pressure drop per control cycle being determined essentially by the opening pressure of inlet non-return valves of the return pumps a separate charging circuit must additionally be provided for the pressure accumulator, by which circuit the pressure in the pressure accumulator can, from time to time (i.e., when the accumulator pressure has fallen below a limiting value monitored by a pressure switch), be raised again to a higher initial value. For this purpose, a further accumulator solenoid charging valve is provided to allow brake fluid to pass from a brake fluid reserve to the return pump and be pumped into the accumulator by the return pump.

Although in this ABS combined with a wheel slip control, a high-pressure pump which is otherwise provided for the charging of the pressure accumulator, is eliminated, the overall expenditure required for electro-hydraulic peripherals (the additional accumulator charging valve, the pressure switch, the high-pressure accumulator and a buffer accumulator, which is connected upstream of the return pump) is by no means inconsiderable.

It is therefore the object of the invention to specify a structure for an anti-lock brake system of the type mentioned at the outset combined with a wheel slip control system at low cost in terms of equipment without, in principle, impairing the functioning of the two control systems.

This object is achieved at the brake circuit of the undriven wheels of the vehicle, operating on the feedback principle during ABS system control, wherein during pressure reduction phases of the anti-lock control, brake fluid is discharged from at least one of the Wheel brakes of the undriven vehicle wheels and is pumped back into the primary output-pressure space of the brake unit. The brake circuit of the driven vehicle wheels operates on the discharge principle during ABS system control wherein, during brake pressure reduction phases of the anti-lock control, brake fluid is discharged at one of the wheel brakes of the driven vehicle wheels and is channelled off towards a brake fluid reservoir of the brake system and wherein for a duration of the activation of the ABS system, brake fluid is pumped out of the reservoir into the secondary output-pressure space by a high-pressure pump. Inlet pressure control valves and outlet valves are provided for each wheel brake of the driven vehicle wheels. The inlet and outlet valves are separately controllable by output signals from an electronic control unit. A neutral position of the inlet valves is their throughflow position, and an excited position of the inlet valves is their blocking position. A neutral position of the outlet valves is their blocking position, and an excited position is their throughflow position. If a signal characteristic of activation of the ASR control is still present at the beginning of braking, the electronic control generates output signals for a specifiable retardation period $t_r$, the duration of which is between 100 and 300 ms; and wherein the output signals hold the ASR control valve in its blocking position, switches the inlet valves back into their neutral position, sets the outlet valves into their excited position and switches off the drive of the high-pressure pump.

According to this the ABS return pump allocated to the brake circuit of the driven vehicle wheels is utilized directly as auxiliary pressure source for the ASR, from which pressure source, in brake pressure build-up phases of the wheel slip control, brake fluid is conveyed directly into the wheel brake(s) subjected to control. A function control a 2/2-way solenoid valve of simple design is utilized when the wheel slip control comes in to shut off the output pressure space allocated to the rear axle brake circuit of the tandem master cylinder from the wheel brakes. Furthermore, the ABS is designed in such a way that at the undriven wheels (the front axle), it operates on the feedback principle, but at the driven vehicle wheels it operates on the discharge principle, according to which, in brake pressure reduction phases of the anti-lock control, brake fluid is discharged out of the wheel brake(s) subjected to control, directly into the brake fluid reservoir through appropriate control of the brake pressure control valves provided for brake control at the driven vehicle wheels. During the braking operation subjected to anti-lock control, brake fluid is fed into the secondary output-pressure space of the brake unit, which space is limited in movable fashion by the floating piston of the master cylinder due to the high-pressure pump allocated to the brake circuit of the driven vehicle wheels to thereby prevent the possibility of said secondary output-pressure space being emptied. If the ASR is still activated at the beginning of braking, e.g. in the sense of a brake pressure build-up phase, and, for a retardation period $t_r$ which begins, for example, with the onset of the brake light output signal, the ABS and ASR control unit generates output signals by which: the ASR control valve is set to its blocking position; the brake pressure control valves of the wheel brakes of the brake circuit of the driven vehicle wheels are set to their brake pressure reduction position; and the drive of the high-pressure pump is switched off. Within the retardation period $t_r$, which is fixed or variable and is designed to have a duration between 100 and 300 ms, preferably about 200 ms, the brake pressure possibly still prevailing in the wheel brakes is thereby reduced at least as far as possible and only then are the valves switched back into their neutral positions permitting the build up of brake pressure by brake actuation. With the switching over of the brake pressure control valves into their pressure reduction position, the pump utilized prior to this as high-pressure source for the rear axle brake circuit is switched off.

The minimum advantages obtained by this design of the ABS and ASR systems and the configuration of the function control provided for the two control systems, as compared with the known anti-lock and wheel slip control systems, are as follows.

A considerable constructional simplification is achieved, since a pressure accumulator for the ASR is no longer required and hence components, such as an additional accumulator charging valve and a pressure switch, otherwise necessary for recharging it outside control cycles of the ASR are also dispensed with. Likewise, a buffer accumulator for the rear axle brake circuit is not utilized. The reduction in the technical expenditure required for implementing the two control systems is considerable.

Admittedly, it must be accepted that in the control system according to the invention, the reactive effect clearly recognizable (possibly pulsating) and perceptible at the brake pedal in the case of a response of the ABS in causing withdrawal of the brake pedal in the direction of its neutral position, is somewhat different to that in known control systems. This arises from the fact that when the ABS responds, brake fluid is fed into the output pressure space allocated to the rear axle brake circuit of the brake unit until the floating piston, limiting the output pressure space of the brake unit, has reached a position near to its neutral position, i.e., a position approximately corresponding to the latter. Here, the quantity of brake fluid conveyed back exclusively into that output pressure space of the brake unit which is allocated to the undriven vehicle wheels, is only that quantity required for pressure reduction in the front wheel brakes subjected to control. This is to ensure that system can still develop braking forces, which permit the utilization of a maximum possible tangential force corresponding to the adhesion coefficient between the roadway and the wheels.

However, this slight functional difference of the combined control system according to the invention can be regarded as insignificant, since in all cases a reliable warning of the response of the ABS is communicated to the driver and this warning is also not too disturbing even if when the ABS responds an essentially constant brake fluid quantity makes a constant contribution to the pedal warning by being fed into that output pressure space of the brake unit which is allocated to the rear axle brake circuit at the same time as a variable brake fluid quantity is conveyed back into that output pressure space of the brake unit which is allocated to the brake circuit of the undriven vehicle wheels (normally, the front axle brake circuit). The quantity of brake fluid is correlated with the braking force still utilizable at this brake circuit. By virtue of the pressure reduction phase in the wheel brakes of the driven vehicle wheels, which pressure reduction phase is triggered in the case of a very rapid transition from a wheel slip-controlled acceleration mode into a braking mode, the possibility of the occurrence of jolting reactive effects on the secondary piston limiting the secondary output-pressure space of the brake unit due to a residual pressure, which can be relatively high (resulting from a wheel slip control and still present at the start of a braking operation) is reliably eliminated. Such reactive effects could lead to a corresponding jolting and unpleasant reactive effect on the brake pedal and, in unfavorable cases, even cause damage to a central valve provided on the secondary piston of the brake unit. This control valve, in the neutral position of the secondary piston, frees the compensating flow path with the conclusion of a braking operation. The pressure compensation between the brake circuit and the brake fluid reservoir is effected and which, in the case of controlled braking when the secondary piston, as a consequence or the feeding of brake pressure into the secondary output-pressure space of the brake unit, reaches it near-neutral position, permits compensating flows from the secondary output-pressure space to the brake fluid reservoir. This results in the pressure prevailing in the secondary output-pressure space of the brake unit being held at the expected value input by driver actuation of the brake pedal.

By virtue of the fact that the inlet valves of the wheel brakes of the brake circuit of the driven vehicle wheels are held open for the duration of the retardation period $t_r$ while at the same time the outlet valves of these wheel brakes are likewise open, the possibility that due to continued running of the high-pressure pump allocated to the brake circuit of the driven vehicle wheels, an excessive pressure will build up in the main brake line of said circuit, which could lead to damage to the pump itself and/or to the main brake line, is avoided.

In the case of a transition from a wheel slip-controlled acceleration mode of the vehicle to a braking operation of the latter, the braking effect in the brake circuit of the undriven vehicle wheels (normally, the front wheels) comes in without delay, while the braking effect in the brake circuit of the driven vehicle wheels (normally, the rear wheels) comes in only after the said retardation period. This is in no way a disadvantage with respect to the dynamic stability of the vehicle. Nevertheless, it is advantageous, with a view to optimum vehicle deceleration, if the brake force friction which can be generated by the wheel brakes allocated to the driven vehicle wheels can take effect as early as possible during a braking operation.

Having the features of an anti-lock brake system, wherein the electronic control unit generates the output signals during the retardation period $t_r$ for holding the ASR control valve in its blocking position in response to one of a vehicle brake light switch output signal and output signals of wheel speed sensors allocated to the driven vehicle wheels (the speed sensor output signals are characteristic of a dynamic behavior of the driven vehicle wheels), specify criteria and measures which are favorable and makes possible an early detection of the transition, from a vehicle acceleration mode and to wheel slip control to a vehicle braking mode and which, if required, is controlled.

The manner of proportioning the duration of the retardation period $t_r$ is by having the retardation period $t_r$ be in a monotonic interrelationship with a duration $t_a$ of the pressure build-up phase of the wheel slip control preceding the braking operation, and preferably having it increase exponentially with the duration $t_a$ of the pressure build-up phase. This can be implemented without significant additional technical expenditure by an appropriate design of the electronic ABS and ASR control unit. This also allows for reducing this period to a minimum necessary to effectively eliminate the stated risk of damage, i.e., to achieve a sufficient brake pressure reduction following which, and only then, brake pressure can be built up again.

The high pressure pump of the ABS system and the high-pressure pump of the ASR system from which, in control phases of the latter, the brake-pressure loading of the wheel brake(s) subjected to control of the brake circuit of the driven vehicle wheels is effected, are designed as reciprocating pumps having a common eccentric drive, and wherein a bypass flowpath in parallel connection to the ASR control valve and having a pressure relief valve is provided.

The pump assembly can, on the one hand, be implemented in terms of construction in the same way as the return pump assembly of an ABS operating on the feedback principle, both at the brake circuit of the undriven vehicle wheels and at the brake circuit of the driven vehicle wheels. On the other hand, it is also ensured that an excessively high pressure cannot be applied to the brake circuit of the driven vehicle wheels.

Also by having a precharging pump, by which brake fluid can be conveyed out of the reservoir of the brake system into the pump chamber of the high-pressure pump of the brake circuit of the driven vehicle wheels, and wherein the high-pressure pump allocated to the brake circuit of the driven vehicle wheels is designed as a self-acting reciprocating suction pump, alternative measures for supplying the inlet of the high-pressure pump utilized as auxiliary pressure source for the ASR, can be made technically more simple.

A particularly simple construction of the pump assembly is achievable by having the reciprocating pump of the brake circuit of the driven vehicle wheels arranged in the immediate vicinity of the brake fluid reservoir and connected to the latter via an inlet non-return valve, the opening pressure of which is at most 0.5 bar and is preferably between 0.2 bar and 0.3 bar. The precharging pump provided in accordance therewith can be accommodated directly in the brake fluid reservoir.

By having the a ASR control valve designed as a 2/2-way solenoid valve, in the neutral position 0 of which the pressure output of the brake unit, allocated to the brake circuit of the driven vehicle wheels, is connected to the main brake line of this brake circuit and with the brake line branching towards the wheel brakes; and in the excited position of which the main brake line is shut off from the brake unit while the pressure output of the high-pressure pump is connected to the main brake line of the brake circuit allocated to the driven vehicle wheels, provides for a particularly simple and functionally reliable configuration of the ASR control valve.

Having the electronic control unit means generate an output signal for setting the ASR control valve to its excited position effecting the shutting off of the brake unit from the main brake line of the rear brake circuit of the driven vehicle wheels, generating on output signal affecting the activation of the high-pressure pump of this brake circuit as well as output signals setting the inlet valves of he wheel brakes of the driven vehicle wheels to their blocking position, as early as when the wheel slip of at least one of the driven vehicle wheels at least reaches or exceeds a predetermined threshold value, the magnitude of which is between the theoretical value of the wheel slip and the response threshold of the wheel slip control, allows the high pressure pump assembly and control valves of the driven wheels to act in a particular sensitive and rapid response to the ASR control.

An additional improvement can be obtained when the output signal of the electronic control unit which effects the activation of the pump drive of the nigh-pressure pump of the driven brake circuit, is generated at least as early as when the wheel slip of at least one of the driven vehicle wheels reaches, or exceeds a pre-determined threshold value, or a value between 50% and 70% of that threshold value, and wherein the ASR control valve means and the inlet valves of the rear wheel brakes are set to their blocking position.

Other objects, advantages and novel features of the present invention will become apparent from the following detailed description of the invention when considered in conjunction with the accompanying drawings.

DETAILED DESCRIPTION OF THE DRAWING

Figure 1:
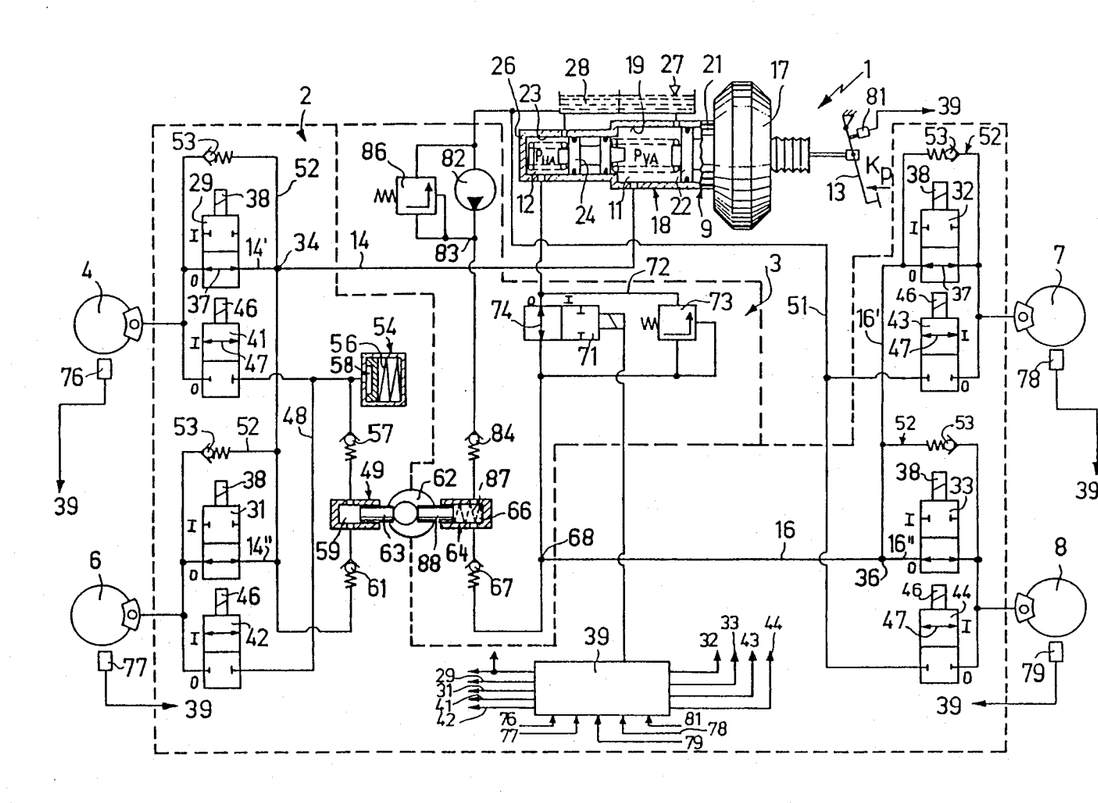
The drawing shows a fluid schematic of the anti-lock wheel slip brake control system of the invention.

The FIGURE shows an electrohydraulic block diagram of a hydraulic dual circuit brake system of a road vehicle equipped both with an anti-lock brake system (ABS) 2 and with a system for wheel slip control (ASR) 3.

In the brake system 1, the front wheel brakes 4 and 6 are linked to form a front axle brake circuit I and the rear wheel brakes 7 and 8 are linked to form a rear axle brake circuit II.

For supplying brake pressure to the two brake circuits I and II, a brake unit is provided which has two output pressure spaces 11 and 12, each of which is respectively allocated to one of the two brake circuits I and II and in which, under the control of the force $K_p$ with which the driver actuates a brake pedal 13 and in proportion thereto, the static brake pressures $P_{VA}$ and $P_{HA}$, can be applied to the wheel brakes 4, 6, 7 and 8 of the front and rear axle brake circuits I and II via the respective main brake line 14 and 16. Within the brake unit is a pneumatic or hydraulic brake power assist unit 17, the boost factor of which has a value of about 3 to 6, and which acts as a brake assistance unit.

The brake unit 9 is designed in such a way that in the event of a failure of the brake power assist unit 17, the brake pressure generating element, in the specific exemplary embodiment illustrated a stepped tandem master cylinder 18, can still be actuated by the pedal force $K_p$ alone.

The front axle brake circuit I is connected to the primary output-pressure space 11 and the real axle brake circuit II is connected to the secondary output-pressure space 12 of this tandem master cylinder 18. The primary output-pressure space 11 is defined in a fixed manner with respect to the housing by the larger bore stage 19 of the master cylinder housing 21 and in axially movable manner by the primary piston 22, which is guided in this larger bore stage 19 so as to be displaceable in pressure tight fashion by the secondary piston 24 of the tandem master cylinder 18. The secondary piston is a floating piston guided so as to be displaceable in pressure tight fashion in the spatially smaller bore stage 23 of the master cylinder housing 21. The secondary output-pressure space 12 is defined in a movable fashion by the secondary piston 24 and in a fixed manner with respect to the housing by the bore stage 23 and the end wall 26 of the master cylinder housing 21.

Insofar as specific designs of t e master cylinder 18 are not expressly detailed below, said cylinder should be assumed to have a design and functioning known to those skilled in the art and as such the details thereof are not repeated herein to shorten this disclosure.

It should furthermore be assumed that the vehicle has a rear axle drive built in accordance with conventional principles of construction and not illustrated for the sake of simplicity, the output torque of the vehicle engine being distributed to the two rear wheels of the vehicle via a rear axle differential not illustrated.

At the front axle brake circuit I, the ABS 2 operates on the feedback principle, according to which, in brake pressure reduction phases of the anti-lock control, brake fluid discharged from one of the wheel brakes 4 and/or 6 is pumped back into the primary output-pressure space 11 of the master cylinder 18 allocated to brake circuit I. The brake pedal 13 is thereby forced back in the direction of its neutral position by a partial stroke correlated to the quantity of brake fluid pumped back, and thus provides an obvious warning as to the activation of the ABS control 2 to the driver. This warning being clearer, the greater is the magnitude of the pressure reduction in the wheel brake(s) 4 and/or 6 subjected to the control. Since the ABS control is responsive in part road conditions, information on road conditions is thereby being communicated, albeit indirectly, to the driver. At the rear axle, the ABS 2 operates on the so-called discharge principle, according to which, in brake pressure reduction phases, brake fluid discharged from the wheel brake(s) 7 and/or 8, subjected to the control, is channelled into the brake fluid reservoir 27 of the brake unit 9 and its chamber 28 associated with the rear axle brake circuit II.

Within the scope of the ABS control 2, each of the two front wheel brakes 4 and 6 and each of the two rear wheel brakes 7 and 8 are provided with an inlet valve 29, 31, 32 and 33 respectively. In the shown neutral positions 0, they connect the brake line branches 14', 14'', 16' and 16'', starting from branching points 34 and 36, respectively, of the main brake line 14 of the front axle brake circuit I and of the main brake line 16 of the rear axle brake circuit II, to the front and rear wheel brakes 4, 6, 7 and 8 respectively, via a throughflow path 37 of these inlet valves 29, 31, 32 and 33.

These inlet valves 29, 31, 32 and 33, of the front and rear axle brake circuits I and II are in each case designed as 2/2-way solenoid valves which can be set to their excited blocking position I, individually or in combination, by excitation of their control magnets 38 by an output signal of an electronic control unit 39, by which the control functions of the ABS 2 and those of the ASR 3 are controlled. In their excited positions, respective wheel brake(s) 4 and/or 6 of the front axle brake circuit I or respective wheel brake(s) 7 and/or 8 of the rear axle brake circuit II are shut off from the main brake line(s) 14 and 16, respectively.

Furthermore, outlet valves 41, 42, 43 and 44 are provided for each of the front and rear wheel brakes 4, 6, 7 and 8, respectively, whereby brake pressure reduction phases for both the anti-lock control and the wheel slip control at the rear axle can be controlled.

These outlet valves 41, 42 are designed as 2/2-way solenoid valves which can be set, individually or in combination, depending at which vehicle wheels the ABS 2 or the ASR 3 responds, by excitation of their control magnets 46 by a control output signal of the electronic control unit 39, to move these valves 41, 42 from their neutral blocking position 0, to their excited throughflow position I, in which the front wheel brake(s) 4 and/or 6 subjected in the particular case to control in the sense of a brake pressure reduction, is (are) connected via the throughflow path 47 of the respective outlet valve to a return line 48 of the front axle brake circuit I and via the latter to a return pump 49, by which brake fluid discharged from the wheel brakes 4 and/or 6 of the front axle brake circuit I can be conveyed back into the primary output-pressure space 11 of the tandem master cylinder 18; and/or the rear wheel brakes 7, 8 are connected to a return line 51 of the rear axle brake circuit II, which leads back directly to the chamber 28 of the brake fluid reservoir 27 of the brake unit 9.

For each of the inlet valves 29, 31, 32 and 33 of the front and rear axle brake circuits I and II respectively, a bypass flow path 52 is provided with a non-return valve 53 in parallel to the respective inlet valve. Non-return valve 53 is held in its blocking position by relatively higher pressure in the main brake line 14 or 16 of the front and rear axle brake circuits I and II than in the respective front or rear wheel brake 4, 6, 7 or 8 respectively. These non-return valves 53 are set so throughflow position by relatively higher pressure in the respective front or rear wheel brakes 4, 6, 7 or 8 respectively. By these bypass flow paths 52 it is ensured that, in the case of a withdrawal of the brake pedal 13, brake pressure can be reduced in the wheel brakes 4, 6, 7 and 8, respectively, even if, the anti-lock brake control were to responded prior to this, or if one of the inlet valves 29, 31, 32 or 33, had remained stuck in its blocking position I.

To the return line 48 of the front axle brake circuit I is connected a low-pressure accumulator 54, the accumulation capacity of which corresponds approximately to, or at least to, that brake fluid volume which must be discharged from the wheel brakes 4 and 6 of the front axel brake circuit I in order to be able to achieve a brake pressure reduction to the minimum possible value even when, prior to this, the respective maximum possible value of the brake pressure $P_{VA}$ had been applied to the wheel brakes 4 and 6 of the front axle brake circuit.

This low-pressure accumulator 54 is designed in a configuration known per se as a piston-spring accumulator, the prestress of its accumulator spring 56 being equivalent to a minimum accumulator pressure of, for example, 3 bar and the output pressure of the accumulator 54 amounting to about 10 bar when the latter is charged to the maximum pressure.

The return pump 49 allocated to the front axle brake circuit I is designed as a conventional free-piston pump, the pump chamber 59 of which is connected via an inlet non-return valve 57 to the accumulator chamber 58 of the low-pressure accumulator 54 and the return line 48 of the front axle brake circuit I and via an outlet non-return valve 61 to the main brake line 14 of the front axle brake circuit I. In this arrangement, the inlet non-return valve 57, which is stressed in the opening direction by a relatively higher pressure in the accumulator chamber 58 than in the pump chamber 59 of the return pump 49, is designed such that the closing force of its closing spring is equivalent to a pressure which is about 20% less than the pressure to which the minimum prestress of the accumulator spring 56 of the low-pressure accumulator 54 is equivalent. The output non-return valve 61 is stressed in the closing direction by a relatively higher pressure in the main brake line 14 of the front axle brake circuit I than in the pump chamber 59 of the return pump 49 and is stressed in the opening direction by a relatively higher pressure in the pump chamber 59 than in the main brake line 14 of the front axle brake circuit I. The outlet non-return valve 61 is designed with respect to its closing force in the same way as the inlet non-return valve 57.

An electrically controllable eccentric drive 62, which can be activated by output signals of the electronic control unit 39 provided for the control of anti-lock and wheel slip control phases of the ASR 3, is provided to drive the return pump 49 of the front axle brake circuit I.

Apart from normal brake functioning, i.e., brake functioning not subjected to ABS or ASR control, only the ABS anti-lock control function which has been discussed, has a control sequence at one of the undriven front wheels and one of the driven rear wheels and can be achieved with the hydraulic and electrohydraulic function elements.

If a tendency to lock up occurs at one of the front wheels, e.g., the right-hand front wheel, the anti-lock control comes into action at the wheel brake 4 of this front wheel with a brake pressure reduction phase. For this purpose, the inlet valve 29 of the right-hand front wheel brake is switched into its blocking position I, the outlet valve 41 of the right-hand front wheel brake 4 is switched into its throughflow position I, and the drive 62 of the return pump 49 is switched on and thereby activated simultaneously with the valves 29 and 41, or even shortly before. In this switching position of the two brake pressure control valves 29 and 41, the right-hand front wheel brake 4 is shut off from the primary output-pressure space 11 of the master cylinder 18 and brake pressure cannot build up further in this wheel brake 4 even if the driver increases the pedal force $K_p$ and the wheel brake 4 is put into communicative connection with the accumulator chamber of the low-pressure accumulator 54 via the now free throughflow path 47 of its outlet valve 41 so that the accumulator chamber can take up the very rapid brake fluid flowing off from the wheel brake cylinder of the wheel brake 4. Thus, a desired rapid brake pressure reduction at the wheel brake 4 subjected to control is achieved.

As soon as a reduction in the tendency to lock up is achieved by this brake pressure reduction, such that the brake slip of the right-hand front wheel and/or its wheel deceleration begin(s) to decrease again, the outlet valve 41 is switched back into its blocking neutral position 0, while the inlet valve 29 is retained in its blocking position and thus the brake pressure in the right-hand front wheel brake 4 is retained at the reduction value it has achieved at this point in time.

If after this, the tendency of the right-hand front wheel to lock up increases again, the outlet valve 41 is switched into its excited throughflow reduction position I again, in order to reduce brake pressure further. If however, the tendency to lock up decreases, then, after the outlet valve 41 has returned again to its neutral blocking position 0, brake pressure is built up again, "stepwise", in the right-hand front wheel brake by pulsating switching of the inlet valve 29 between its blocking position I and its throughflow position 0, until the brake pressure input by the driver through actuation of the brake unit 9 is reached.

The pump drive 62 which was switched on at the onset of control remains switched on at least until, with the conclusion of an anti-lock control cycle, the low-pressure accumulator 54 is also completely discharged again, i.e., a quantity of brake fluid corresponding to that discharged from the wheel brake 4 has been pumped back into the primary output-pressure space 11 of the master cylinder 18. In a typical design, the return pump 49 has a displacement volume of 0.2 cm$^3$ per stroke of its piston 63, and the eccentric drive 62 is at about 5,000 rpm. This means that the return pump 49 requires about 25 ms in order to convey a quantity of 4 cm$^3$ of brake fluid into the master cylinder 18. This quantity of brake fluid corresponds to that which must be displaced out of the primary output-pressure space 11 of the master cylinder 18 into the brake circuit I for a vehicle of medium size and conventional configuration and design of the brake system 1, in order to generate the maximum utilizable brake pressure in the wheel brakes 4 and 6 in the case of good adhesion coefficients between the roadway and the vehicle wheels.

By virtue of the feedback of brake fluid into the primary output-pressure space 11 of the master cylinder 18 of the brake unit 9 when the ABS 2 is activated at the front axle, the above-mentioned return movement of the brake pedal 13, in the direction of its neutral position, pulsates as the piston strokes of the return pump 49 occurs, thus providing the driver with the warning concerning the activation of the ABS 2 at the front axle.

In accordance with customary principles of construction, the return pump 49 of the front axle brake circuit I is designed as a free-piston pump which thus conveys brake fluid back into the master cylinder 18 of the brake unit 9 only when the pressure in the low-pressure accumulator 54 and in the line elements communicating with the accumulator chamber 58 (in particular the return line 48) is greater than the opening pressure of the inlet non-return valve 57 of the return pump 49.

Regarding the control of brake pressure reduction, brake pressure holding and renewed brake pressure build-up phases of the anti-lock control at the rear axle brake circuit II, the switching over of the inlet valves 32 and 33 as well as of the outlet valves 43 and 44 which are allocated to the rear wheel brakes 7 and 8, takes place in an exact analogous fashion for control of the corresponding brake pressure control valves 29, 31, 41 and 42 of the front wheel brakes 4 and 6.

However, in contrast to the anti-lock control at the front axle wherein brake fluid is channelled back to the brake unit 9, brake fluid, discharged from one or both rear wheel brake(s) 7 and/or 8 of the rear axle brake circuit II for the purpose of brake pressure reduction when the anti-lock control responds at the rear axle, is not conveyed back into the secondary output-pressure space 12 of the master cylinder 18 of the brake unit 9, but rather is channelled back directly into the brake fluid reservoir 27, or its chamber 28 allocated to the rear axle brake circuit II.

Accordingly, an accumulator corresponding in function to the low-pressure accumulator 54 of the front axle brake circuit I is not required for the rear axle brake circuit II. This entails a considerable simplification of the hydraulic unit of the ABS 2 compared to the hydraulic unit of an ABS operating on the feedback principle at both brake circuits.

In the event of a response of the anti-lock control at the rear axle and to prevent the possibility of the rear axle brake circuit II from being set empty under extreme control conditions, such as drastic changes in the friction coefficients effective between the roadway and the braked vehicle wheels, brake circuit II is operated as an open brake circuit during a control phase of the ABS. To this end, an additional high-pressure pump 64 is provided while the ABS is activated by which brake fluid is conveyed continuously out of the brake fluid reservoir 27 into the secondary output-pressure space 12 of the master cylinder 18 of the brake unit 9. In anti-lock control mode, the secondary piston 24 is thereby pushed back in the direction of its neutral position corresponding to the non-actuated condition of the brake system. As soon as the secondary piston reaches a position near to its neutral position, a compensating flow path in bore 23 is open, or at least partially uncovered, so that a compensating stream can from then flow from the secondary output-pressure space 12 directly to the brake fluid reservoir 27, 28 of the brake unit 9. Under such conditions, the pressure in the secondary output-pressure space 12 of the tandem master cylinder 18 is that which the driver dynamically inputs by the actuation of the brake pedal 13. By virtue of this retreat of the secondary piston 24 of the master cylinder 18, a constant applied contribution to the perceptible warning at the brake pedal 13 as to the activation of the ABS is achieved, over which is superimposed the pulsating warning concerning the activation of the ABS at the front axle brake circuit I.

This additional high-pressure pump 64 is used within the scope of the ASR 3 as an auxiliary pressure source, from which, in brake pressure build-up phases of the wheel slip control, the respective rear wheel brake(s) 7 and/or 8, used for the control are subjected to brake pressure. Here, brake fluid is conveyed at high pressure by the high-pressure pump 64 out of the reservoir 27, 28 of the brake system 1 into that section of the main brake line 16 of the rear axle brake circuit II which branches towards the rear wheel brakes 7 and 8. The pump chamber 66 of this high-pressure reciprocating pump 64 is connected, via an output non-return valve 67 which is stressed in the opening direction by a relatively higher pressure in the pump chamber 66 than in the main brake line 16 of the rear axle brake circuit II and develops a closing force equivalent to an opening pressure of about 2 to 3 bar, to that section of the main brake line 16 of the rear axle brake circuit II which branches towards wheel brakes 7 and 8.

Between the connection point 68 concerned and the pressure output 69 of the secondary output-pressure space 12 of the master cylinder 18 are an ASR control valve 71 and a bypass flow path 72 connected in parallel. The bypass flow path 72 leads through a pressure relief valve 73 which limits the pressure in the main brake line 16 of the rear axle brake circuit II to a value of about 200 bar.

This pressure limitation to a value corresponding approximately to the maximum possible brake pressure achievable by the brake unit 9 is necessary in order to protect the wheel brakes 7 and 8 from damage in wheel slip control mode, since, by reason of its construction, the reciprocating pump 64 is capable of generating considerably higher output pressures.

The ASR control valve 71 is designed as a 2/2-way valve, the neutral throughflow position 0 of which connects the main brake line 16 branching towards the rear wheel brakes 7 and 8 to the pressure output 69 of the secondary output-pressure space 12 of the tandem master cylinder 18 via the throughflow path 74. The ASR control valve 71 is held in the illustrated neutral throughflow position 0 both in normal brake operation, i.e. brake operation not subjected to anti-lock control, and in braking situations in which the ABS 2 is activated.

When the ASR control 3 responds, the ASR control valve 71 is triggered by a control output signal of the electronic control unit 39 into its excited blocking position I thereby shutting off that section of the main brake line 16 of the rear axle brake circuit II which branches towards the rear wheel brakes 7 and 8 from the secondary output-pressure space 12 of the brake unit 9.

Simultaneously with the switching of the ASR control valve 71 into its blocking position I, the reciprocating pump 64 of the ASR 3 is also switched on.

In a typical progression of a wheel slip control sequence, the control comes in, starting with a brake pressure build-up phase at one of the two rear wheels, e.g., the right-hand rear wheel 7. The correct selection in terms of control of this rear wheel is accomplished by the inlet valve 32 of its rear wheel brake 7 being held in the neutral throughflow position 0 suitable for the brake pressure build-up, while the inlet value 33 of the wheel brake 8 of the left-hand rear wheel, which is initially not to be subjected to control, is set to its blocking position I.

As soon as the wheel slip of the rear wheel under consideration decreases again by reason of the rear wheel brake 7 being subjected to brake pressure, the inlet valve 32 of this wheel brake 7 is set to its blocking position I by excitation of its control magnet 38 by an output signal of the electronic control unit 39 while the outlet valve 43 of this wheel brake 7 is initially held in its blocking neutral position 0. At this phase, the brake pressure input into the wheel brake 7 is thereby achieved. The inlet valve of the left-hand rear wheel brake 8 also remains in its blocking position I. If the brake pressure thus held is insufficient to bring the wheel slip of the rear wheel under consideration into the range of values compatible with good directional stability, the inlet valve 32 is switched back into its neutral throughflow position 0 and the brake pressure in the rear wheel brake 7 is once again increased, whereupon, if the wheel slip of the rear wheel under consideration decreases again, the inlet valve 32 is once more switched into its blocking position I.

If after this, or where relevant after further control sequences analogous to the control sequence explained above, the wheel slip of the rear wheel subjected to control returns into the range of values compatible with good forward acceleration and with sufficient directional stability, then, in a concluding brake pressure reduction phase of the wheel slip control, the brake pressure applied to the wheel brake 7 is reduced again by switching its outlet valve 43 into its excited throughflow position I. It is possible, of course, for such a pressure reduction phase to be interrupted again, if because of the brake pressure reduction the wheel slip of the rear wheel under consideration increases again and has to be reduced again by control sequences of the type explained above.

The output signals required for appropriate control of the brake pressure inlet and outlet control valves 29, 31–33 and 41–44 both for anti-lock control and for wheel slip control, are generated by the common electronic control unit 39 both for the ABS 2 and for the ASR 3 control function. These output signals are obtained from comparative, differentiating and associative processing, in accordance with known criteria, of electrical output signals from wheel speed sensors 76, 77, 78 and 79 which are individually allocated to the vehicle wheels and emit output voltage signals characteristic in terms of level and/or frequency of their dynamic behavior. Also, this electronic control unit is usually supplied with the output signal of the brake light switch 81, said signal being generated upon actuation of the brake system 1 to thus prepare the electronic control unit 39 for the anti-lock control mode.

In addition, the following functions are controlled by the electronic control unit 39, it being assumed that given a knowledge of these functions, a person skilled in the art is capable of designing the control device 39 in a manner corresponding to its function and that therefore a detailed explanation of the necessary measures in the field of electronics/circuitry required for implementing these functions can be omitted from this disclosure for the sake of brevity.

To explain these functions, a traffic situation may be assumed which, while the vehicle is in acceleration mode and the wheel slip control has responded, suddenly in the middle of the control mode, requires braking. In such a situation, the electronic control unit 39 generates a combination of output signals for a predetermined or predeterminable retardation period $t_r$ which begins with the initiation of braking, by which signals the ASR control valve 71, which, in order to make possible a brake pressure build-up in the rear wheel brakes 7 and 8, must be switched back into its starting position, initially, for the duration of the retardation period $t_r$, remains held in its blocking position and the outlet valves 43 and 44 are set to their excited pressure reduction position I, while only the inlet valves 32 and 33, as required for normal braking, are switched back into their starting pressure build-up position 0. Also, the high-pressure pump 64 is also switched off simultaneously, i.e., simultaneously with the initiation of braking. In this combination of functional positions of the ASR control valve and of the inlet valves 32 and 33 and of the outlet valves 43 and 44 of the rear wheel brakes 7 and 8, which lasts for the retardation period $t_r$, brake pressure which has been built up or held in at least one of the rear wheel brakes 7 and/or 8 in the preceding control phase of the ASR, is to the greatest possible extent reduced. A reactive effect of the pressure which was effective prior to this, in the wheel brakes 7 and/or 8 and can be very high and is to the greatest possible extent excluded. Hence, an unpleasant jolting pedal reaction which may irritate the driver is avoided. As a result of the fact that the inlet valves 32 and 33 are open, even brief continued running of the high-pressure pump 64 after it has been switched off cannot lead to the possibility of pressure building up in the main brake line 16.

Admittedly it is necessary, in order to make possible this gentle transition from a vehicle acceleration mode subjected to wheel slip control to a braking mode, that a certain additional expenditure is required in terms of control technology to have inlet valves 32 and 33 and the outlet valves 43 and 44 be separately controllable, as compared with the known control system, in which only a single 3/3-way solenoid valve is provided for pressure build-up, pressure holding and pressure reduction functions of both control modes per wheel brake. However, this additional expenditure is at most low, since the inlet and outlet valves 32, 33, 43 and 44, respectively, are designed as 2/2-way solenoid valves of simple construction.

In the simplest case, the electronic control unit 39 detects the occurrence of the above-described transitional situation from a logical ANDing of the still available control signal, by which the ASR control valve 71 is set to its blocking position I, with the brake light switch output signal coming in with the initiation of braking. Alternatively or additionally, the electronic control unit 39 can also detect the initiation of braking from the output signals from the wheel speed sensors 78 and 79 allocated to the driven vehicle wheels, said signals changing during this procedure.

The duration of the retardation period $t_r$ can be fixed beforehand, in which case a value of 200 ms±50 ms is advantageous. The retardation period $t_r$ can also be altered in monotonic relation to the duration $t_a$ of the immediately preceding brake pressure build-up phase of the wheel slip control, e.g., in the form of an exponential interrelationship, in such a way that following a pressure build-up phase of only relatively short duration, a relatively short duration of the retardation period $t_r$ is also utilized and thus brake pressure can be built up in the wheel brakes 7 and 8 in a correspondingly earlier fashion.

The slight delay of the brake pressure build-up at the rear axle brake circuit II compared to the front axle brake circuit I can be accepted without reservation.

In the specific embodiment illustrated in the drawing, the reciprocating pump 64 utilized as auxiliary pressure source within the scope of the ASR 3 is driven by the eccentric drive 62 which also drives the return pump 49 of the front axle brake circuit I, and, in the specific configuration illustrated, is like the return pump 49, designed as a free-piston pump, the displacement volume per piston stroke of which corresponds to that of the return pump 49.

The pump unit, comprising the return pump 49, the eccentric drive 62 and the additional free-piston pump 64, of the brake system can thus be realized in exactly the same fashion as the return-pump unit of an ABS operating on the feedback principle both at the front axle and at the rear axle.

For charging the pump chamber 66 of the free-piston pump 64 utilized as auxiliary pressure source of the ASR 3 with brake fluid, which can then be displaced at a high pressure level into the rear axle brake circuit II by the free-piston pump 64, an electrically driven precharging pump 82 has its output pressure 83 connected to the pump chamber 66 via an inlet non-return valve 84 analogous in construction and function to the inlet non-return valve 57 of the return pump 49 of the front axle brake circuit. The opening pressure of this inlet non-return valve 84 is in the customary range between 2 and 3 bar.

A pressure relief valve 86, by which the output pressure level of the precharging pump 82 is limited to a value in the range between 10 and 20 bar, is connected between the pressure output 83 of the precharging pump 82 and the brake fluid reservoir 27, 28. It goes without saying that the precharging pump 82 must be designed as a self-acting suction pump. At the same time, it is expedient if the pump used as precharging pump 82 is of a type whose inlet side does not have to be connected to the brake fluid reservoir via a non-return valve but can be connected to said reservoir directly.

In principle, it is also possible to dispense with a precharging pump 82 if the reciprocating pump 64, utilized as auxiliary pressure source of the ASR 3, is designed as a self-acting suction pump, this being possible for example, by a restoring spring 87 (indicated in broken lines) arranged within the pump chamber 66 and which constantly attempts to force the return piston 88 of the pump 64 into its position associated with the maximum volume of the pump chamber 66, i.e., attempts to hold it in contact with the eccentric pin 89. However, the inlet non-return valve 84 of the pump 64 must then be designed for an opening pressure which is considerably lower than 1 bar. This is possible, since non-return valves having opening pressures of 0.2 to 0.5 bar can be readily constructed.

This fact notwithstanding however, it is more advantageous if the reciprocating pump 64 utilized as the pressure source of the ASR 3 is operated in combination with a precharging pump 82 in order to ensure that the inlet brake-fluid stream of the pump 64 cannot break off.

It is then also possible to operate the anti-lock control in such a way that brake fluid is fed into the secondary output-pressure space 12 of the tandem master cylinder 18 only when the ABS 2 has responded at the rear axle. For this purpose, it is sufficient to switch on the precharging pump 82 and thereby allow the high-pressure pump 64 to come into effect, when control has to be exercised at the rear axle.

The ASR 3 responds with a preliminary brake pressure build-up phase when the wheel slip $\lambda_A$ of at least one of the driven vehicle wheels reaches or exceeds a response threshold $\lambda_{AS}$ of, for example, 30%, and/or when the circumferential acceleration b of the wheel, for its part, reaches or exceeds a physically unrealistically high threshold value $b_s$ of, for example, 1 g (g=9.81 m/s$^2$), or differs by more than a threshold value b from the vehicle acceleration.

The definition of the wheel slip $\Delta_A$ given by the following relation is here assumed:

$$\lambda_A = (V_R - V_F)/V_R, \text{ wherein}$$

$V_R$ designates the circumferential speed of the vehicle wheel under consideration and $V_F$ designates the vehicle speed or a reference value approximately representing this and formed in accordance with algorithms known per se. The ASR 3 is designed such that it keeps the wheel slip $\lambda_A$ within a theoretical value range bounded by an upper limit $\lambda_{AO}$ of, for example, 20%. If, by virtue of the wheel slip control, there is a fall below this limit $\lambda_{AO}$ again, the control is switched off again.

It goes without saying that these threshold or limiting values $\lambda_{AS}$ and $\lambda_{AO}$ can have various values, depending on AS and the vehicle speed, the tires, the roadway etc.

Moreover, the ASR 3 is preferably constructed with the following functional characteristics:

If the wheel slip of one of the driven vehicle wheels exceeds a threshold value $\lambda_{Ab}$, which, although higher than the upper limit $\lambda_{AO}$ of the theoretical value range, is still substantially lower than the response threshold $\lambda_{AS}$ of the ASR 3, this is interpreted by the electronic control unit 39 to mean that the wheel slip control must soon be activated. Accordingly, and in preparation, the ASR control valve 71 is switched into its blocking position I, the inlet valves 32 and 33 of the rear wheel brakes 7 and 8 are switched into their blocking position I, and the precharging pump 82 and the reciprocating pump 64 provided as auxiliary pressure source for the ASR 3 are also switched on simultaneously or even somewhat earlier. As a result, even before brake pressure has to be applied to the wheel brake(s) 7 and/or 8 of the brake circuit II of the driven vehicle wheels, a high pressure has already built up in that section of the main brake line 16 of the rear axle brake circuit II which branches towards the wheel brakes 7 and 8 of the driven rear wheels of the vehicle. This section then acts in a manner similar to a pressure accumulator, charged to a high pressure, from which brake pressure must be applied to the respective wheel brake 7 and/or 8 subjected to control. As soon as the control, following an exceeding of the wheel slip or of the acceleration threshold value, must come into effect, the brake pressure is applied by switching the respective inlet valve 32 and/or 33 back into its neutral position 0.

By this preparation of the wheel slip control mode, a sufficiently rapid response behavior of the ASR 3 is achieved in, statistically, by far the overwhelming majority of acceleration situations requiring control, although a pressure accumulator, which is provided in customary wheel slip control devices as an auxiliary pressure source and constantly has to be kept at a high output pressure level, is not provided.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Anti-lock brake system (ABS) for a road vehicle which is also equipped with a wheel slip control system (ASR) which operates on the principle of decelerating a vehicle wheel tending to spin by activating its wheel brake so that wheel slip remains held within a defined range of values compatible with adequate directional stability, wherein:

the brake system is a hydraulic dual-circuit brake system having two static brake circuits, one brake circuit being allocated to the undriven wheels of the vehicle and the other brake circuit being allocated to the driven wheels of the vehicle;

a brake unit is provided for supplying brake pressure to the two brake circuits, and has a primary and a secondary output-pressure space, one of which is allocated to each of the brake circuits respectively and from which brake unit, pressures can be applied to the brake circuits after being built up by a pedal-force-controlled displacement of piston means in said brake unit which movably delimits the output pressure spaces;

a high-pressure pump means is provided for each of the two brake circuits to feed brake fluid into the output pressure spaces of the brake unit in control phases of the ABS system for the purpose of preventing the brake circuits from becoming empty as well as to obtain a warning as to the activation of the ABS system;

the high-pressure pump means for the brake circuit of the driven vehicle wheels also provides an auxiliary pressure source for the ASR system to supply brake pressure to the wheel brake(s) of the driven wheels subjected to wheel slip under control of brake pressure control valve means individually allocated to the wheel brakes;

means connecting and disconnecting the brake circuit of the driven vehicle wheels to the secondary output-pressure space, which is separated with respect to the primary output-pressure space of the brake unit by a floating piston of the piston means, in response to output signals from an electronic control unit means by an ASR control valve means for the duration of control cycles of the ASR system;

the ASR control valve means assuming a throughflow position during normal braking mode and braking mode subjected to an anti-lock control, wherein the brake circuit of the driven vehicle wheels is connected to the secondary output-pressure space of the brake unit;

the brake circuit of the undriven wheels of the vehicle operating on the feedback principle during ABS system control, wherein during pressure reduction phases of the anti-lock control, brake fluid is discharged from at least one of the wheel brakes of the undriven vehicle wheels and is pumped back into the primary output-pressure space of the brake unit;

the brake circuit of the driven vehicle wheels, operating on the discharge principle during ABS system control wherein, during brake pressure reduction phases of the antilock control, brake fluid is discharged at one of the wheel brakes of the driven vehicle wheels and is channelled off towards a brake fluid reservoir of the brake system and wherein for a duration of the activation of the ABS system, brake fluid is pumped out of the reservoir into the secondary output-pressure space by a high-pressure pump;

inlet pressure control valve means and an outlet pressure control valve means are provided for each wheel brake of the driven vehicle wheels;

said inlet and outlet valve means being separately controllable by output signals from the electronic control unit means;

a neutral position of the inlet valve means being their throughflow position;

an excited position of the inlet valve means being their blocking position;

a neutral position of the outlet valve means being their blocking position;

an excited position of the outlet valve means being their throughflow position;

wherein if a signal characteristic of activation of the ASR control is still present at the beginning of braking, the electronic control until means generates output signals for a specifiable retardation period $t_r$, the duration of which is between 100 and 300 ms;

and wherein the output signals hold the ASR control valve means in its blocking position switches the inlet valve means back into their neutral position sets the outlet valve means into their excited position and switches off the drive of the high-pressure pump.

2. Anti-lock brake system according to claim 1, wherein the electronic control unit means generates the output signals during the retardation period $t_r$ for holding the ASR control valve means in its blocking position in response to at least one of a vehicle brake light switch output signal and output signals of wheel speed sensors allocated to the driven vehicle wheels; said speed sensor output signals being characteristic of a dynamic behavior of the driven vehicle wheels.

3. Anti-lock brake system according to claim 1, wherein the retardation period $t_r$ is in a monotonic interrelationship with a duration $t_a$ of the pressure build-up phase of the wheel slip control preceding the operation and preferably increases exponentially with the duration $t_a$ of the pressure build-up phase.

4. Anti-lock brake system according to claim 2, wherein the retardation period $t_r$ is in a monotonic interrelationship with a duration $t_a$ of the pressure build-up phase of the wheel slip control preceding the operation and preferably increases exponentially with the duration $t_a$ of the pressure build-up phase.

5. Anti-lock brake system according to claim 1, wherein the high pressure pump of the ABS system and the high-pressure pump of the ASR system, from which, in control phases of the latter, the brake-pressure loading of the wheel brake(s) subjected to control of the brake circuit of the driven vehicle wheels is effected, are designed as reciprocating pumps having a common eccentric drive; and wherein a bypass flowpath in parallel connection to the ASR control valve and having a pressure relief valve is provided.

6. Anti-lock brake system according to claim 4, wherein a precharging pump is provided for conveying brake fluid out of reservoir of the brake system into the pump chamber of the high-pressure pump of the brake circuit of the driven vehicle wheels.

7. Anti-lock brake system according to claim 5, wherein a precharging pump is provided for conveying brake fluid out of reservoir of the brake system into the pump chamber of the high-pressure pump of the brake circuit of the driven vehicle wheels.

8. Anti-lock brake system according to claim 6, wherein the high-pressure pump of the ASR system for the driven vehicle wheels is a self-acting reciprocating suction pump.

9. Anti-lock brake system according to claim 8, wherein the self-acting reciprocating suction pump is arranged in the immediate vicinity of the brake fluid reservoir and is connected to the latter via an inlet non-return valve, the opening pressure of which is at most 0.5 bar and is preferably between 0.2 bar and 0.3 bar.

10. Anti-lock brake system according to claim 1, wherein the ASR control valve is a 2/2-way solenoid valve, the neutral throughflow position of which permits pressure output from the secondary pressure output space of the brake unit to be connected to a main brake line of the rear brake circuit;

said main brake line branching towards the rear driven wheel brakes; and wherein in the excited blocking position of said ASR control valve, the main brake line is shut off from the brake unit while the pressure output of the high-pressure pump is connected to the main brake line.

11. Anti-lock brake system according to claim 10, wherein the electronic control unit means generates an output signal for setting the ASR control valve to its excited position effecting the shutting off of the brake unit from the main brake line of the rear brake circuit of the driven vehicle wheels, and generates on output signal effecting the activation of the high-pressure pump of this brake circuit as well as output signals setting the inlet valves of the wheel brakes of the driven vehicle wheels to their blocking position;

said output signals being generated as early as when the wheel slip of at least one of the driven vehicle wheels at least reaches or exceeds a predetermined threshold value, the magnitude of which is between the theoretical value of the wheel slip and the response threshold of the wheel slip control.

12. Anti-lock brake system according to claim 11, wherein the output signal of the electronic control unit which effects the activation of the pump drive of the high-pressure pump of the driven brake circuit, is generated at least as early as when the wheel slip of at least one of the driven vehicle wheels reaches, or exceeds a pre-determined threshold value, or a value between 50% and 70% of that threshold value, and wherein the ASR control valve means and the inlet valves of the rear wheel brakes are set to their blocking position.

* * * * *